United States Patent
Kim

(10) Patent No.: US 10,780,889 B2
(45) Date of Patent: Sep. 22, 2020

(54) APPARATUS FOR DETECTING ROAD SURFACE STATE IN MOTOR-DRIVEN POWER STEERING AND CONTROL METHOD THEREOF

(71) Applicant: Hyundai Mobis Co., Ltd., Seoul (KR)

(72) Inventor: Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 88 days.

(21) Appl. No.: 16/139,598

(22) Filed: Sep. 24, 2018

(65) Prior Publication Data

US 2019/0092335 A1    Mar. 28, 2019

(30) Foreign Application Priority Data

Sep. 27, 2017    (KR) .......................... 10-2017-0124940

(51) Int. Cl.
| | |
|---|---|
| *B60W 40/06* | (2012.01) |
| *B62D 6/00* | (2006.01) |
| *G01L 5/22* | (2006.01) |
| *B62D 6/10* | (2006.01) |
| *B60W 10/20* | (2006.01) |

(52) U.S. Cl.
CPC ............. *B60W 40/06* (2013.01); *B62D 6/007* (2013.01); *B62D 6/008* (2013.01); *G01L 5/221* (2013.01); *B60W 10/20* (2013.01); *B60W 2552/00* (2020.02); *B62D 6/10* (2013.01)

(58) Field of Classification Search
CPC .............................. B60W 40/06; B62D 6/007
See application file for complete search history.

(56) References Cited

U.S. PATENT DOCUMENTS

| | | | | |
|---|---|---|---|---|
| 6,163,747 | A * | 12/2000 | Matsuno ................. | B60T 8/172 303/146 |
| 9,150,244 | B2 * | 10/2015 | Klein ................... | B62D 5/0481 |
| 2013/0074576 | A1 * | 3/2013 | Kouchi ................... | B60T 8/172 73/9 |

FOREIGN PATENT DOCUMENTS

KR    10-2000-0003073    1/2000

* cited by examiner

*Primary Examiner* — Anne Marie Antonucci
*Assistant Examiner* — Abdalla A Khaled
(74) *Attorney, Agent, or Firm* — H.C. Park & Associates, PLC

(57) ABSTRACT

Disclosed herein are an apparatus for detecting a road surface state in motor-driven power steering (MDPS) and a method for controlling the apparatus. The apparatus may include a column torque sensor to detect column torque applied to a steering column and to output a column torque signal; a steering angle sensor to detect a steering angular velocity of a steering wheel; a vehicle speed sensor to detect a driving speed of a vehicle; and a road surface determiner to determine a road surface state based on a boost gain, which is calculated based on the driving speed and the column torque, and on a phase offset between the column torque and the steering angular velocity and to output a road surface determination signal.

9 Claims, 7 Drawing Sheets

APPARATUS FOR DETECTING ROAD SURFACE STATE IN MOTOR-DRIVEN POWER STEERING AND CONTROL METHOD THEREOF

CROSS-REFERENCES TO RELATED APPLICATION

This application claims priority from and the benefit of Korean Patent Application No. 10-2017-0124940, filed on Sep. 27, 2017, which is hereby incorporated by reference for all purposes as if set forth herein.

BACKGROUND

Field

Exemplary embodiments of the invention relate to an apparatus for detecting a road surface state in motor-driven power steering (MDPS) and a method for controlling the apparatus, and more particularly, to an apparatus for detecting a road surface state in MDPS and a method for controlling the apparatus, which may improve steering feel with optimized assistive torque by providing a road surface state that is determined based on a phase offset between column torque and a steering angular velocity.

Discussion of the Background

Generally, motor-driven power steering (MDPS) is a device for providing assistive torque in the direction in which a driver steers a vehicle using a driving motor, whereby light steering feel may be provided.

Unlike hydraulic power steering (HPS), MDPS automatically controls the operation of a driving motor depending on the driving condition of a vehicle, thereby improving steering performance and steering feel.

Here, the MDPS includes a torque sensor for measuring driver's steering torque inputted to a steering wheel, a steering angle sensor for measuring the steering angle of the steering wheel, a vehicle speed sensor for measuring a vehicle speed, and the like, and determines the driving condition of the vehicle using these sensors.

Then, the MDPS senses a motor current flowing in the driving motor using a current sensor, receives the sensed current that is fed back to the MDPS, and performs steering control using a closed-loop control method in which voltage is applied to the driving motor by controlling the motor current, which is sensed and fed back to the MDPS, so as to follow a target current that is calculated and inputted in advance for steering control.

A steering wheel delivers information about a road surface state to a driver in the form of vibration, and such feedback enables the driver to detect the road surface state and the grip of tires and helps safe driving. However, when the MDPS excessively intervenes in steering or when the MDPS does not correctly reflect information about the road surface state, the MDPS may adversely affect safe driving.

Particularly, when a vehicle is driven on a low-friction road with a slippery surface, if assistive torque is provided using the same method as the method of providing assistive torque in a normal road condition, the steering wheel may become too light, which makes the driver feel nervous and disturbs safe driving.

Conversely, when the vehicle is driven on a high-friction road, the steering wheel may become too heavy, which makes the driver feel uncomfortable.

The related art of the invention is disclosed in Korean Patent Application Publication No. 2000-0003073 published on Jan. 15, 2000 and entitled "Apparatus and method of controlling a car using a threshold value by a road condition".

The above information disclosed in this Background section is only for enhancement of understanding of the background of the invention and, therefore, it may contain information that does not constitute prior art.

SUMMARY

Exemplary embodiments of the invention are directed to an apparatus for detecting a road surface state in motor-driven power steering (MDPS) and a method for controlling the apparatus, which may provide better steering feel to a driver with assistive torque that is suitable for road surface conditions by providing a road surface state that is determined based on a phase offset between column torque and a steering angular velocity.

In one embodiment, an apparatus for detecting a road surface state in motor-driven power steering (MDPS) may include a column torque sensor to detect column torque applied to a steering column and to output a column torque signal; a steering angle sensor to detect angular velocity of a steering wheel; a vehicle speed sensor to detect driving speed of a vehicle; and a road surface determiner to determine a road surface state based on a boost gain and a phase offset between the column torque and the steering angular velocity and to output a road surface determination signal, the boost gain being calculated based on the driving speed and the column torque.

The road surface determiner may include a boost gain calculation unit to calculate the boost gain for adjusting assistive torque of the MDPS depending on the driving speed and the column torque; a phase offset detection unit to detect the phase offset between the column torque and the steering angular velocity and to calculate magnitude of the phase offset; and a road surface state determiner to determine the road surface state through comparison with a friction coefficient threshold value based on a ratio between the boost gain and the phase offset and to output the road surface determination signal.

The boost gain calculation unit calibrates the boost gain by receiving the road surface determination signal that is outputted from the road surface state determiner.

The phase offset detection unit calibrates the magnitude by adjusting a scale of the phase offset.

The apparatus may further include a lateral acceleration sensor to detect a lateral acceleration of the vehicle, and the road surface state determiner may include a road surface state determination unit to calibrate the friction coefficient threshold value depending on the lateral acceleration.

In another embodiment, a method for controlling an apparatus for detecting a road surface state in motor-driven power steering (MDPS) may include receiving, by a road surface determiner, a driving speed, column torque, and a steering angular velocity from a vehicle speed sensor, a column torque sensor, and a steering angle sensor, respectively; calculating, by the road surface determiner, a boost gain to adjust assistive torque of MDPS depending on the driving speed and the column torque; detecting, by the road surface determiner, a phase offset between the column torque and the steering angular velocity and calculating, by the road surface determiner, magnitude of the phase offset; and determining, by the road surface determiner, a road surface state through comparison with a friction coefficient threshold value based on a ratio between the boost gain and the phase offset and outputting, by the road surface determiner, a road surface determination signal.

The calculating of the boost gain may include calibrating, by the road surface determiner, the boost gain by receiving the road surface determination signal from the road surface determiner.

The detecting of the phase offset and the calculating of the magnitude of the phase offset may be configured such that the road surface determiner calculates the magnitude by adjusting a scale of the phase offset.

The method may further include receiving, by the road surface determiner, a lateral acceleration from a lateral acceleration sensor; and determining, by the road surface determiner, the road surface state by calibrating the friction coefficient threshold value depending on the lateral acceleration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
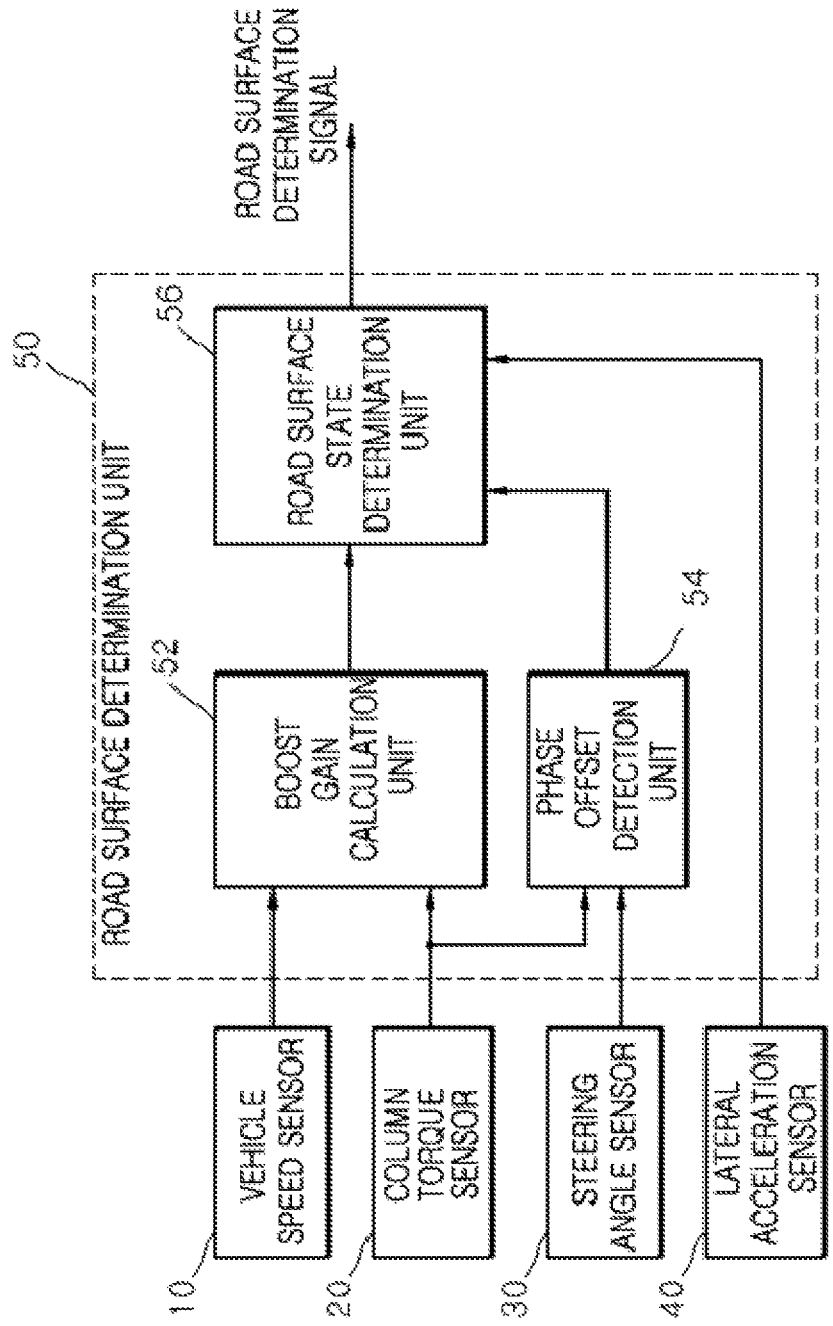
FIG. 1 is a block diagram illustrating an apparatus for detecting a road surface state in motor-driven power steering (MDPS) in accordance with an embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, an apparatus for detecting a road surface state in MDPS and a method for controlling the apparatus in accordance with the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
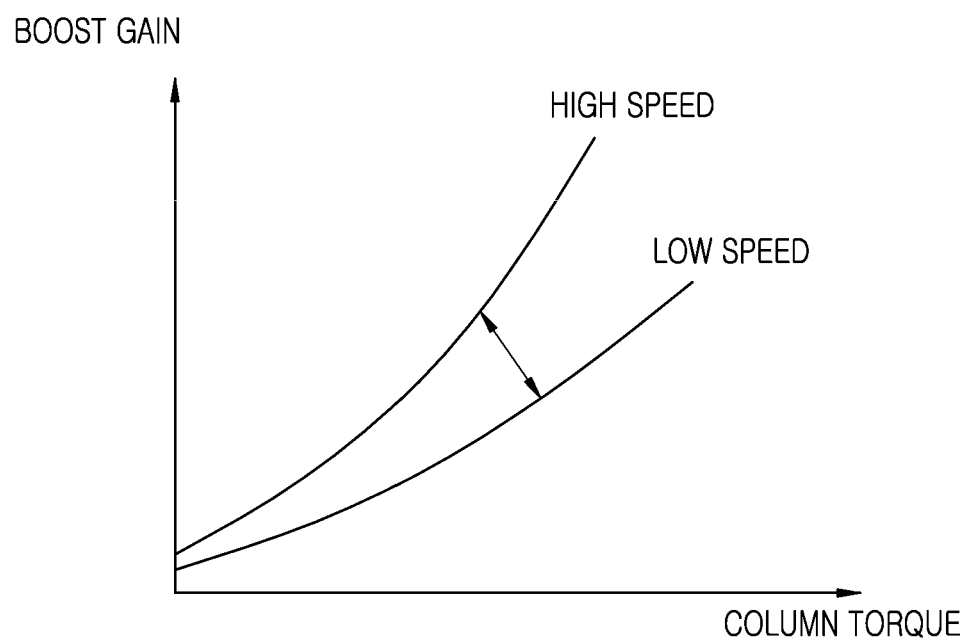
FIG. 2 is a graph illustrating the relationship between column torque and a boost gain in an apparatus for detecting a road surface state in MDPS in accordance with an embodiment of the invention.
Figure 3:
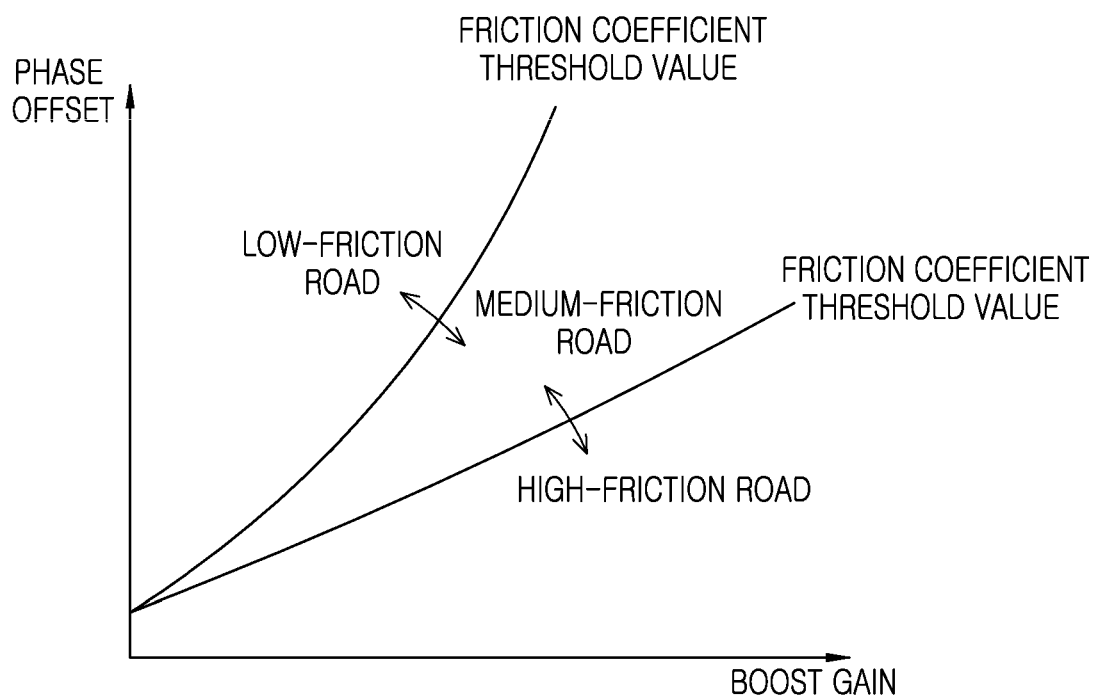
FIG. 3 is a graph illustrating the relationship between a boost gain and a phase offset in an apparatus for detecting a road surface state in MDPS in accordance with an embodiment of the invention.
Figure 4:
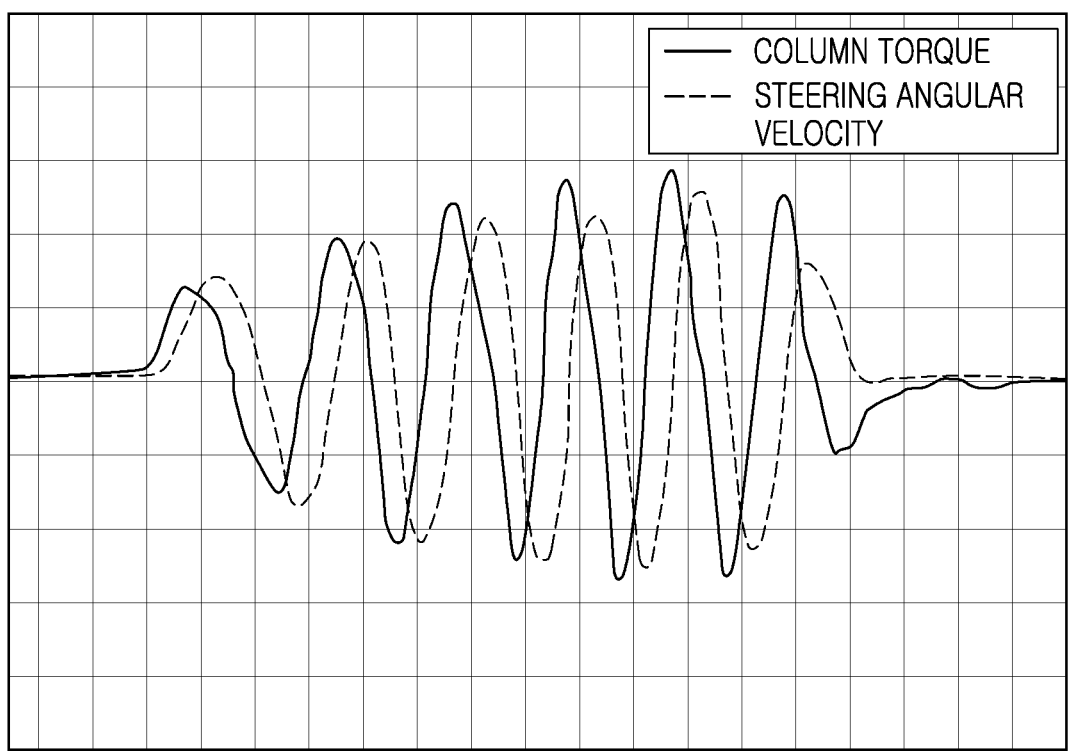
FIG. 4 is a graph illustrating the relationship between column torque and a steering angular velocity in an apparatus for detecting a road surface state in MDPS during steering on a low-friction road in accordance with an embodiment of the invention.
Figure 5:
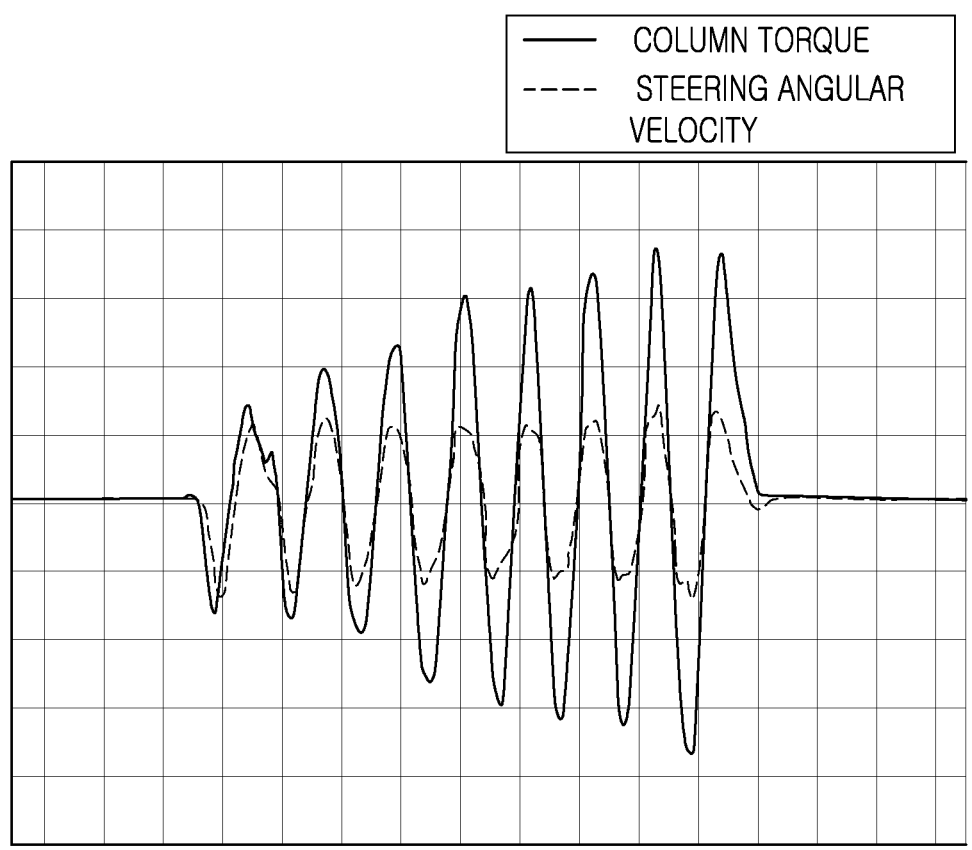
FIG. 5 is a graph illustrating the relationship between column torque and a steering angular velocity in an apparatus for detecting a road surface state in MDPS during steering on a high-friction road in accordance with an embodiment of the invention.
Figure 6:
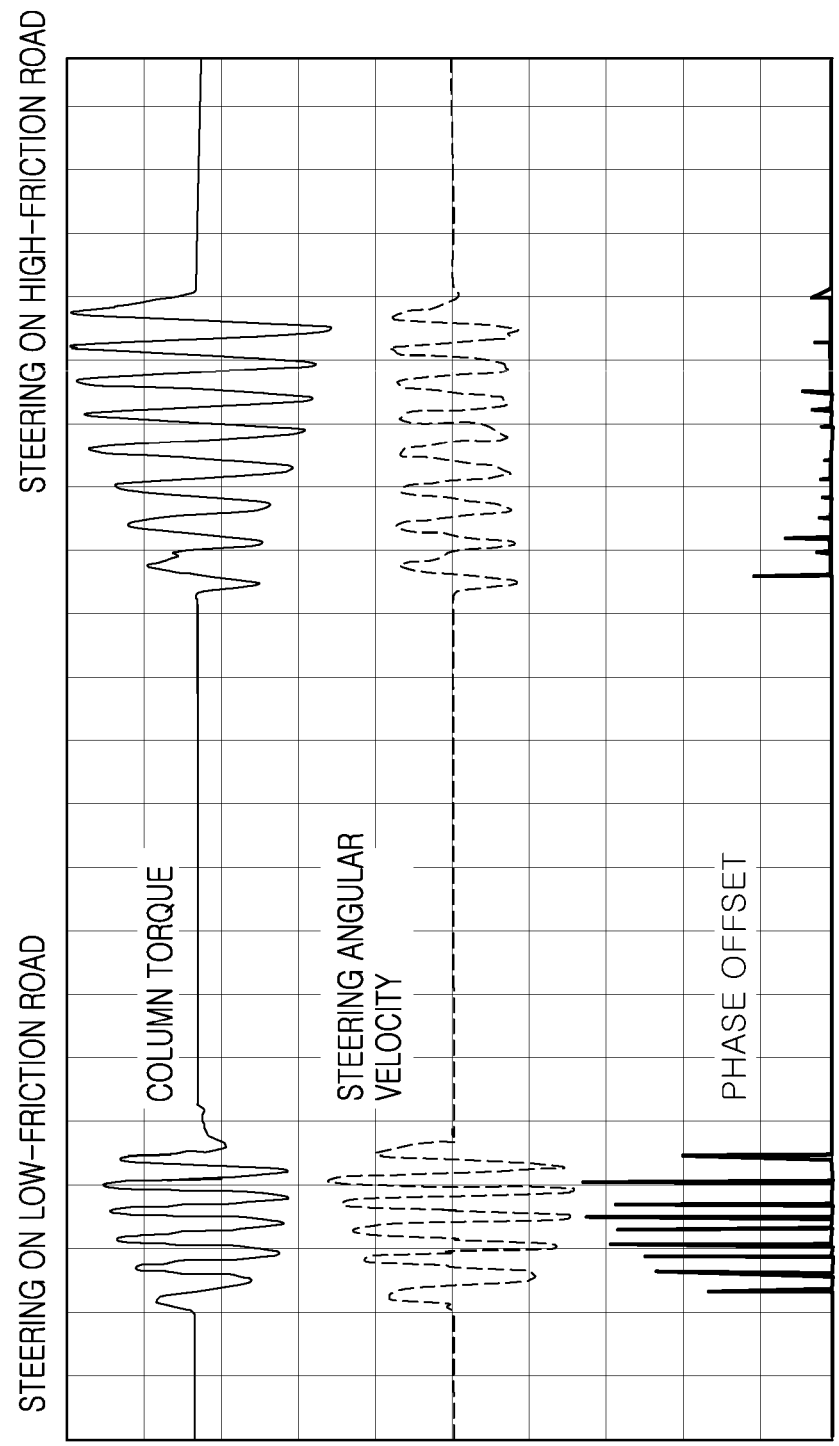
FIG. 6 is a graph illustrating a phase offset between column torque and a steering angular velocity in an apparatus for detecting a road surface state in MDPS in accordance with an embodiment of the invention.

FIG. 1 is a block diagram illustrating an apparatus for detecting a road surface state in MDPS in accordance with an embodiment of the invention, FIG. 2 is a graph illustrating the relationship between column torque and a boost gain in an apparatus for detecting a road surface state in MDPS in accordance with an embodiment of the invention, FIG. 3 is a graph illustrating the relationship between a boost gain and a phase offset in an apparatus for detecting a road surface state in MDPS in accordance with an embodiment of the invention, FIG. 4 is a graph illustrating the relationship between column torque and a steering angular velocity in an apparatus for detecting a road surface state in MDPS during steering on a low-friction road in accordance with an embodiment of the invention, FIG. 5 is a graph illustrating the relationship between column torque and a steering angular velocity in an apparatus for detecting a road surface state in MDPS during steering on a high-friction road in accordance with an embodiment of the invention, and FIG. 6 is a graph illustrating a phase offset between column torque and a steering angular velocity in an apparatus for detecting a road surface state in MDPS in accordance with an embodiment of the invention.

As illustrated in FIG. 1, an apparatus for detecting a road surface state in MDPS in accordance with an embodiment of the invention may include a vehicle speed sensor 10, a column torque sensor 20, a steering angle sensor 30, and a road surface determination unit 50, and may further include a lateral acceleration sensor 40.

The vehicle speed sensor 10 detects the driving speed of a vehicle and provides the same to the a road surface determination unit 50.

Here, the vehicle speed sensor 10 may include various types of sensors, such as a sensor that detects a vehicle speed using the rotational speed of the wheel of a driving vehicle, a sensor that detects a vehicle speed using a global positioning system (GPS), and the like.

The column torque sensor 20 detects column torque that is applied to a steering column (not illustrated) when a driver turns a steering wheel (not illustrated), and provides the same to the a road surface determination unit 50.

The steering angle sensor 30 detects the steering angular velocity of the steering wheel and provides the same to the a road surface determination unit 50.

Here, the steering angle sensor 30 may detect the steering angular velocity by including an optical sensor therein, or may detect the steering angular velocity using the time derivative of a measured steering angle.

Also, the steering angular velocity may be acquired by measuring the motor angular velocity of a driving motor (not illustrated).

The a road surface determination unit 50 determines a road surface state based on a boost gain, which is calculated based on the driving speed and the column torque, and on a phase offset between the column torque and the steering angular velocity or the motor angular velocity and outputs a road surface determination signal.

Specifically describing this, the a road surface determination unit 50 may include a boost gain calculation unit 52, a phase offset detection unit 54, and a road surface state determination unit 56.

The boost gain calculation unit 52 calculates a boost gain for adjusting the assistive torque of the MDPS depending on the driving speed and the column torque.

As illustrated in FIG. 2, the boost gain may be calculated depending on the column torque using a graph in which the slope differs depending on a driving speed.

Here, the boost gain calculation unit 52 may calibrate the boost gain by receiving the road surface determination signal and by adjusting the slope that is dependent on the driving speed.

That is, the boost gain calculation unit 52 adjusts the boost gain depending on the road surface determination signal. Accordingly, in the case of a low-friction road, the boost gain calculation unit 52 decreases the slope, thereby decreasing assistive torque on the low-friction road. In the case of a high-friction road, the road boost gain calculation unit 52 increases the slope, thereby increasing assistive toque on the high-friction road. Accordingly, assistive torque that is more optimized for the road surface may be provided to a driver.

The phase offset detection unit 54 detects a phase offset between column torque and a steering angular velocity or a motor angular velocity and calculates the magnitude thereof.

Here, the phase offset detection unit 54 improves the accuracy of the phase offset by adjusting the scale thereof, and calculates the magnitude thereof.

As illustrated in FIG. 4, examining a change in column torque and a change in a steering angular velocity or a motor angular velocity during steering on a low-friction road, the steering angular velocity or the motor angular velocity has the maximum value when the change in the column torque is greatest, that is, when the column torque becomes 0 Nm during steering.

In the case of a low-friction road, when a change in column torque is greatest, a load on the MDPS is reduced, which may improve the responsiveness of the MDPS. Accordingly, when the change in the column torque is greatest, the steering angular velocity or the motor angular velocity has the maximum value.

Meanwhile, as illustrated in FIG. 5, examining a change in column torque and a change in a steering angular velocity or a motor angular velocity during steering on a high-friction road, a load to column torque, which is generated when the torsion bar of a pinion is twisted, is increased, which decreases the responsiveness of the mechanical part of the MDPS and the driving motor. Accordingly, when the column torque is greatest, the steering angular velocity or the motor angular velocity has the maximum value.

That is, the higher the load, the greater the amount by which the phase of the steering angular velocity or the motor angular velocity is delayed. Therefore, the state of a road surface may be determined by calculating the delayed amount.

As illustrated in FIG. 6, examining the phase offset between column torque and a steering angular velocity or a motor angular velocity, a greater phase offset is detected during steering on a low-friction road, but a less phase offset is detected during steering on a high-friction road. Accordingly, a quantitative criterion for the phase offset is set, and the state of a road surface may be determined based on the phase offset.

As described above, the phase offset detection unit 54 monitors a steering angular velocity or a motor angular velocity in the temporal vicinity of the time at which column torque becomes 0 Nm while a driver steers a vehicle, that is, while the driver steers in the opposite direction after column torque becomes equal to or greater than a certain value. Then, the phase offset detection unit 54 detects the difference of the phases depending on the monitored value, whereby the phase offset is detected.

The accuracy of the phase offset is improved by adjusting the scale of the detected phase offset to an appropriate level and then calculating the absolute value thereof, whereby the optimal phase offset for determining a road surface state may be derived.

The road surface state determination unit 56 determines a road surface state through comparison with a friction coefficient threshold value based on the boost gain, which is calculated by the boost gain calculation unit 52, and on the phase offset, which is detected by the phase offset detection unit 54, and outputs a road surface determination signal.

That is, as illustrated in FIG. 3, a friction coefficient threshold value is set using the relationship between the boost gain and the phase offset, and the road surface state may be determined to be a low-friction road, a medium-friction road, or a high-friction road.

Here, the friction coefficient threshold value may be estimated by measuring the change of the phase offset depending on the boost gain on roads with different friction coefficients in an experiment, and may be set based on the estimation result.

In the embodiment, the lateral acceleration sensor 40 detects the lateral acceleration or the yaw rate of a vehicle and provides the same to the a road surface determination unit 50, that is, the road surface state determination unit 56, so as to calibrate the friction coefficient threshold value in real time depending on the lateral acceleration or the yaw rate.

When a vehicle is moved whereby a driver steers the vehicle, lateral force is generated. Also, because a load increases in the direction in which lateral force is generated, an additional phase offset between the column torque and the steering angular velocity or the motor angular velocity is caused.

Accordingly, for the phase offset changed by the lateral force, the road surface state determination unit 56 may calibrate the friction coefficient threshold value depending on the lateral acceleration or the yaw rate.

Here, the lateral force may be determined using the lateral acceleration or the yaw rate.

As described above, the apparatus for detecting a road surface state in MDPS in accordance with an embodiment of the invention determines a road surface state based on a phase offset between column torque and a steering angular velocity or a motor angular velocity and provides the same, thereby providing better steering feel to a driver with assistive torque that is suitable for the condition of the road surface.

Figure 7:
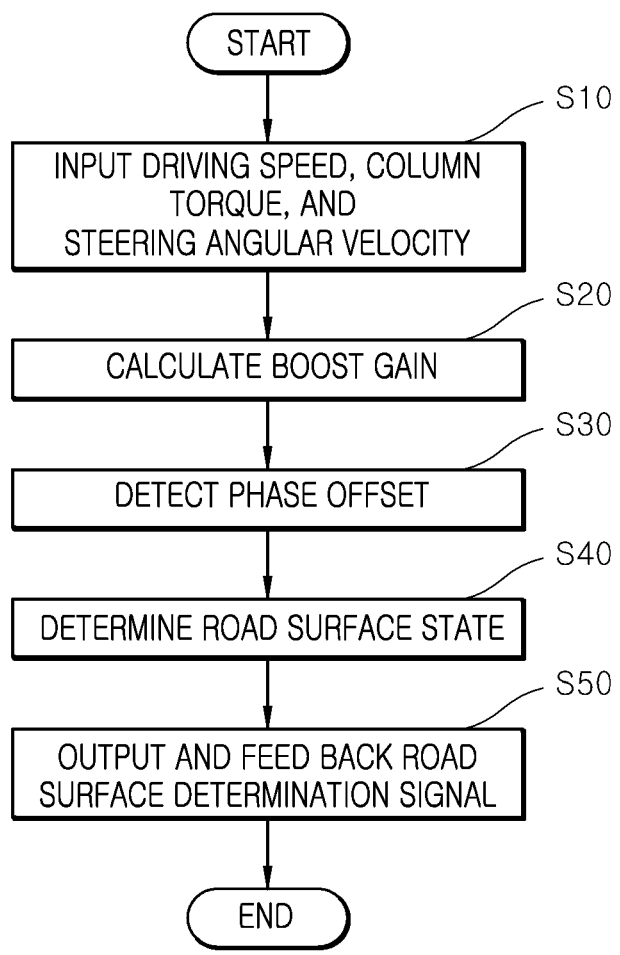
FIG. 7 is a flowchart for explaining a method for controlling an apparatus for detecting a road surface state in MDPS in accordance with an embodiment of the invention.

FIG. 7 is a flowchart for explaining a method for controlling an apparatus for detecting a road surface state in MDPS in accordance with an embodiment of the invention.

As illustrated in FIG. 7, in the method for controlling an apparatus for detecting a road surface state in MDPS in accordance with an embodiment of the invention, first, the a road surface determination unit 50 receives a driving speed, column torque, and a steering angular velocity from the vehicle speed sensor 10, the column torque sensor 20, and the steering angle sensor 30, respectively, at step S10.

Here, the a road surface determination unit 50 may receive the steering angular velocity or the motor angular velocity of a driving motor.

The a road surface determination unit 50 calculates a boost gain for adjusting the assistive torque of MDPS at step S20 depending on the driving speed and the column torque inputted at step S10.

Here, the boost gain may be calculated depending on the column torque using a map in which the slope differs depending on a driving speed, as illustrated in FIG. 2.

Then, the a road surface determination unit 50 detects a phase offset between the column torque and the steering angular velocity or the motor angular velocity, which are inputted at step S10, and calculates the magnitude of the phase offset at step S30.

Here, the a road surface determination unit 50 improves the accuracy of the detected phase offset by adjusting the scale thereof to an appropriate level, and calculates the absolute value thereof, whereby the optimal phase offset for determining a road surface state may be derived.

Based on the boost gain calculated at step S20 and the phase offset calculated at step S30, the a road surface determination unit 50 determines a road surface state through comparison with a friction coefficient threshold value at step S40.

That is, the road surface determination unit 50 sets the friction coefficient threshold value using the relationship between the boost gain and the phase offset, as illustrated in FIG. 3, and determines the road surface state to be a low-friction road, a medium-friction road, or a high-friction road through comparison with the friction coefficient threshold value.

Here, the friction coefficient threshold value may be estimated by measuring the change of the phase offset depending on the boost gain on roads with different friction values in an experiment, and may be set depending on the estimation result.

After determining the road surface state at step S40, the a road surface determination unit 50 outputs a road surface determination signal depending on the determination result at step S50, thereby enabling the MDPS to provide optimal assistive torque depending on the road surface state and calibrating the boost gain by adjusting the slope that is dependent on the driving speed using the road surface determination signal fed back to the a road surface determination unit 50.

As described above, the boost gain is adjusted depending on the road surface determination signal. In the case of a low-friction road, assistive torque is decreased by decreasing the slope. In the case of a high-friction road, assistive torque is increased by increasing the slope. Accordingly, assistive torque that is more optimized for the road surface may be provided to a driver.

On the one hand, the a road surface determination unit 50 may calibrate the friction coefficient threshold value by receiving the lateral acceleration or the yaw rate of the vehicle from the lateral acceleration sensor 40.

When a vehicle is moved whereby a driver steers the vehicle, lateral force is generated. Also, because a load increases in the direction in which lateral force is generated, an additional phase offset between the column torque and the steering angular velocity or the motor angular velocity is caused.

Accordingly, for the phase offset changed by the lateral force, the road surface determination unit 50 may calibrate the friction coefficient threshold value, which is necessary for determining a road surface state, in real time depending on the lateral acceleration or the yaw rate.

As described above, in the method for controlling an apparatus for detecting a road surface state in MDPS in accordance with an embodiment of the invention, a road surface state determined based on a phase offset between column torque and a steering angular velocity or a motor angular velocity is provided, whereby assistive torque that is suitable for the condition of the road surface may be provided in MDPS, and better steering feel may be provided to a driver.

The apparatus for detecting a road surface state in MDPS and a method for controlling the apparatus in accordance with one aspect of the invention determines a road surface state based on a phase offset between column torque and a steering angular velocity and provides the same, whereby assistive torque suitable for a road surface condition may be provided in the MDPS, and better steering feel may be provided to a driver.

Although preferred embodiments of the invention have been disclosed for illustrative purposes, those skilled in the art will appreciate that various modifications, additions and substitutions are possible, without departing from the scope and spirit of the invention as defined in the accompanying claims.

Accordingly, the scope of the invention shall be determined only according to the attached claims.

What is claimed is:

1. An apparatus for detecting a road surface state in motor-driven power steering (MDPS), the apparatus comprising:
 a column torque sensor to detect column torque applied to a steering column and to output a column torque signal;
 a steering angle sensor to detect a steering angular velocity of a steering wheel;
 a vehicle speed sensor to detect a driving speed of a vehicle; and
 a road surface determiner to determine a road surface state based on a boost gain and a phase offset between the column torque and the steering angular velocity and to output a road surface determination signal, the boost gain being calculated based on the driving speed and the column torque,
 wherein the determined road surface state is one of a low-friction road, a medium-friction road, and a high-friction road.

2. The apparatus of claim 1, wherein the road surface determiner comprises:
 a boost gain calculation unit to calculate the boost gain for adjusting assistive torque of the MDPS depending on the driving speed and the column torque;
 a phase offset detection unit to detect the phase offset between the column torque and the steering angular velocity and to calculate magnitude of the phase offset; and
 a road surface state determiner to determine the road surface state through comparison with a friction coefficient threshold value based on a ratio between the boost gain and the phase offset and to output the road surface determination signal.

3. The apparatus of claim 2, wherein the boost gain calculation unit is configured to calibrate the boost gain by receiving the road surface determination signal that is outputted from the road surface state determiner.

4. The apparatus of claim 2, wherein the phase offset detection unit is configured to calculate the magnitude of the phase offset by adjusting a scale of the phase offset.

5. The apparatus of claim 2, further comprising:
 a lateral acceleration sensor to detect a lateral acceleration of the vehicle,
 wherein the road surface state determiner comprises a road surface state determination unit to calibrate the friction coefficient threshold value depending on the lateral acceleration.

6. A method for controlling an apparatus for detecting a road surface state in motor-driven power steering (MDPS), the method comprising:
 receiving, by a road surface determiner, a driving speed, column torque, and a steering angular velocity from a vehicle speed sensor, a column torque sensor, and a steering angle sensor, respectively;
 calculating, by the road surface determiner, a boost gain to adjust assistive torque of MDPS depending on the driving speed and the column torque;
 detecting, by the road surface determiner, a phase offset between the column torque and the steering angular velocity and calculating, by the road surface determiner, magnitude of the phase offset; and
 determining, by the road surface determiner, a road surface state through comparison with a friction coefficient threshold value based on a ratio between the boost gain and the phase offset and outputting, by the road surface determiner, a road surface determination signal,
 wherein the determined road surface state is one of a low-friction road, a medium-friction road, and a high-friction road.

7. The method of claim 6, wherein the calculating of the boost gain comprises:
 calibrating, by the road surface determiner, the boost gain by receiving the road surface determination signal from the road surface determiner.

8. The method of claim 6, wherein the detecting of the phase offset and the calculating of the magnitude of the phase offset is configured such that the road surface determiner calculates the magnitude by adjusting a scale of the phase offset.

9. The method of claim 6, further comprising:
 receiving, by the road surface determiner, a lateral acceleration from a lateral acceleration sensor; and
 determining, by the road surface determiner, the road surface state by calibrating the friction coefficient threshold value depending on the lateral acceleration.

* * * * *